(12) United States Patent
Samanta et al.

(10) Patent No.: US 7,623,472 B2
(45) Date of Patent: Nov. 24, 2009

(54) DYNAMIC PEER APPLICATION DISCOVERY

(75) Inventors: Sumanesh Samanta, Kolkata (IN); Anirban Bhattacharyya, Kolkata (IN)

(73) Assignee: LSI Corporation, Milpitas, CA (US)

( * ) Notice: Subject to any disclaimer, the term of this patent is extended or adjusted under 35 U.S.C. 154(b) by 549 days.

(21) Appl. No.: 11/272,920

(22) Filed: Nov. 14, 2005

(65) Prior Publication Data

US 2007/0109976 A1  May 17, 2007

(51) Int. Cl.
*H04L 12/28* (2006.01)
*H04L 12/16* (2006.01)
*G06F 15/16* (2006.01)
*G06F 15/173* (2006.01)

(52) U.S. Cl. .................. 370/254; 370/270; 370/392; 370/395.3; 709/204; 709/223; 709/245

(58) Field of Classification Search ............... None
See application file for complete search history.

(56) References Cited

U.S. PATENT DOCUMENTS

| | | | |
|---|---|---|---|
| 7,400,596 B1 * | 7/2008 | Robertson et al. | 370/312 |
| 2004/0246971 A1 * | 12/2004 | Banerjee et al. | 370/395.5 |
| 2005/0117525 A1 * | 6/2005 | Poustchi et al. | 370/254 |
| 2005/0163061 A1 * | 7/2005 | Piercey et al. | 370/255 |
| 2007/0064718 A1 * | 3/2007 | Ekl et al. | 370/432 |

* cited by examiner

*Primary Examiner*—Gregory B Sefcheck
*Assistant Examiner*—Salvador E Rivas
(74) *Attorney, Agent, or Firm*—William W. Cochran; Cochran Freund & Young LLC (57) ABSTRACT

Dynamic discovery of active peer applications and information related thereof in a network is described. In one embodiment of the present invention, the discovery and information related to peer applications is maintained by a plurality of network device peers. This information is supplemented by device or peer application failure information, which is identified through point-to-point communication initiated by a failure to receive a multicast packet from a particular network peer application.

19 Claims, 5 Drawing Sheets

DYNAMIC PEER APPLICATION DISCOVERY

BACKGROUND

A. Technical Field

This invention relates generally to discovery of peer devices on a network, and more particularly, to dynamic discovery of peer applications running in the network.

B. Background of the Invention

A network allows multiple devices to communicate with each other via network connections. Typically, the ability for such devices to communicate with its peer devices ("peers") requires a minimum knowledge and identification of the peers' characteristics. A peer may be any network device such as sensors, phones, personal digital assistants ("PDAs"), personal computers ("PCs"), servers, supercomputers, etc.

The discovery of peers is considered a preliminary step in establishing communication between the peer devices. However, because peers and their characteristics may change over time, communication on the network often requires that these changes be monitored and maintained. This monitoring may be performed using various methods including direct point-to-point monitoring or having a central location that monitors network elements and peers.

There are various existing solutions for the discovery of peers in a network. In one such solution, as shown in FIG. ("FIG.") 1, directories are dedicated to store the information about the peers such as their name, address, resources and metadata. Network elements may access the directories to locate other networked peers and retrieve particular information thereabout. For example in a directory service model, for Peer A 101 to know the peers existent in the network, it has to contact directory server 100. After receiving information on the peers existent in the network, peer A 101 may request information on a particular peer, for example Peer C 103. The directory server replies to Peer A 101 with the information related to Peer C 103. Thereafter, further communication between Peer A 101 and Peer C 103 may occur.

Figure 1:
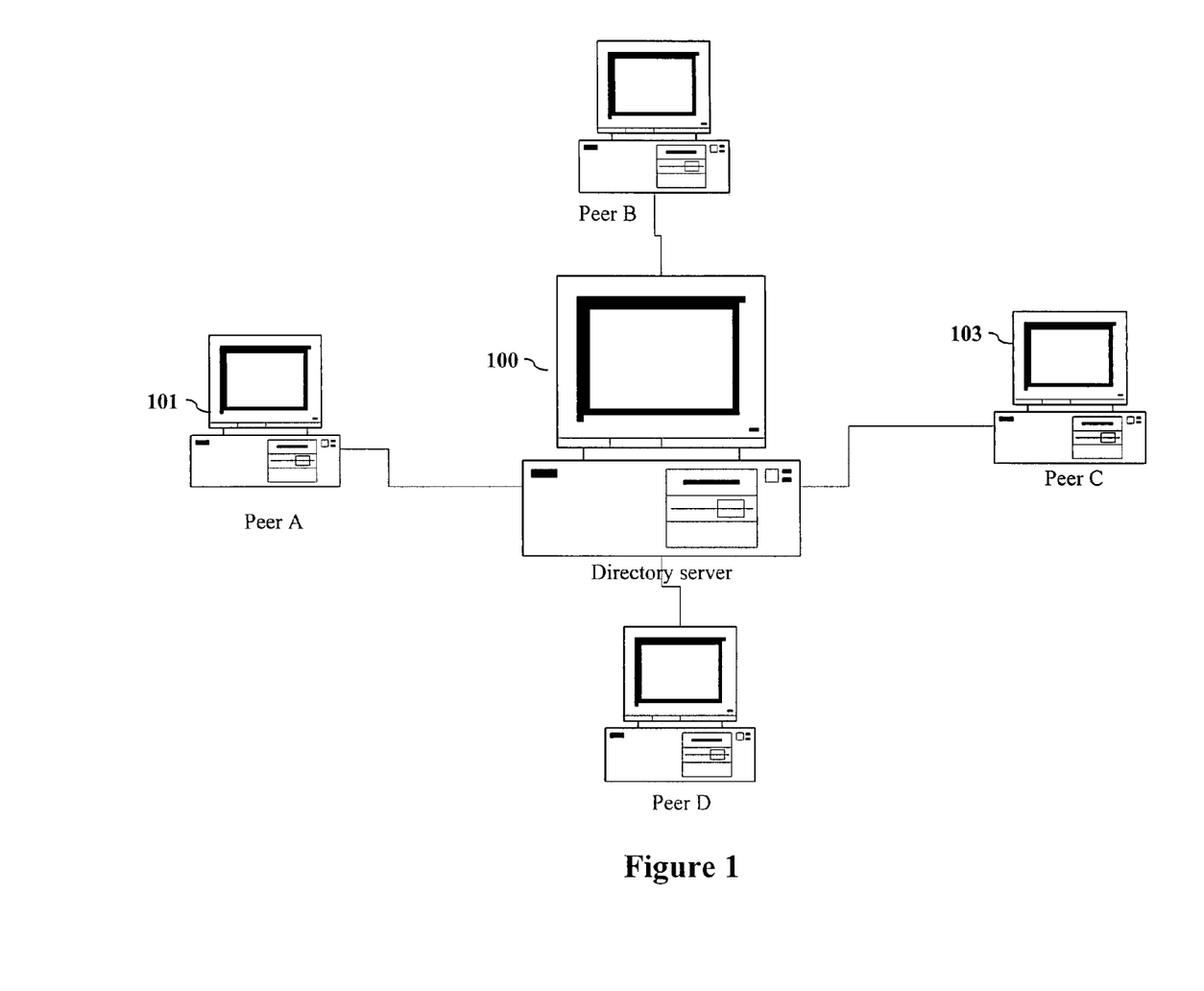
FIG. 1 shows a general block diagram of directory service model for discovery of peers.

The information on the existing peers in the network is continuously updated in the directory maintained within directory server 100. In order to allow network elements/peers to access this directory server 100, each peer has to be configured with the location of the directory server 100. This configuration procedure is tedious and error prone. Moreover, the solution suffers inherently from "single point of failure," a condition arising because of the complete reliability on the centralized directory for information about the network. Accordingly, if the directory server 100 fails, then the discovery procedure fails.

Figure 2:
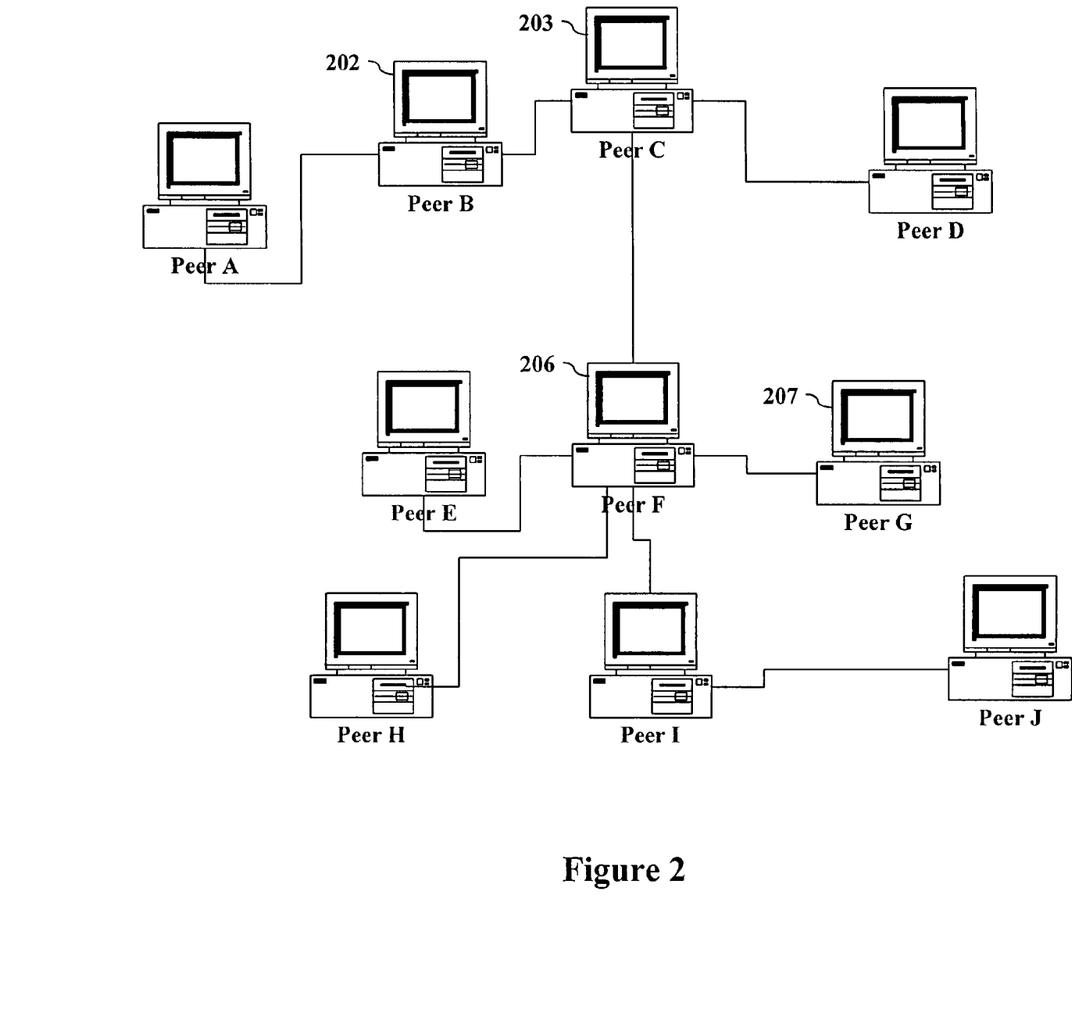
FIG. 2 shows a general block diagram of the network model for discovery of peers.

The problem of single point of failure arising due to centralized information storage on directory is overcome in a network model as shown in FIG. 2. In a network model, every peer in the network assists in discovery. Specifically, a single peer does not know the structure of the entire network or the identity of every peer participating in the network. Instead, peers know only of the peers with which they are in direct communication. In order to know the peers existent in the network peers have to pass on a request to its neighboring peers. If those peers are unable to satisfy the request, the same request is passed on to their neighboring peers and so on until the request is satisfied. For example, if Peer B 202 needs information on existence of Peer G 207. A request from Peer B 202 is sent to Peer C 203, a peer device with which Peer B 202 may already communicate. In this scenario, there is no direct link between Peer C 203 and Peer G 207 so Peer C 203 is unaware of information on Peer G 207. Accordingly, the request is further passed to Peer F 206, which contains information on Peer G 207, which is then finally passed to Peer B 202. As a result, a communication channel between Peer B 202 and Peer G 207 may be properly configured. Although this model overcomes the single point of failure model, it does require active assistance of other peers of the network for discovery service and may further burden the network elements and connections.

A multicast model overcomes the need of active participation of peers for discovery service. A multicast datagram can be sent to multiple devices. The sender of a multicast datagram does not need complete information about the network elements/peers that are to receive the datagram. In particular, a single packet is sent from a source and is replicated as needed in the network to reach as many network elements as necessary. In this way, multicasting yields performance improvements and conserves bandwidth end-to-end. Discovery using multicast technology works by having peers periodically announce their existence using multicast.

The multicast approach is inherently unreliable (because it depends on UDP, which is essentially an unreliable protocol) because a multicast announcement may not reach a particular network element or may not be received by a network element prior to a communication attempt with the announcing peer and its dependence on unreliable protocols such as UDP. This problem leads to incomplete information about certain peers/element on the network and applications running on a peer may produce faulty output because of this incomplete information.

Various systems and networking protocols also fail to define an effective peer discovery mechanism. For example, the point-to-point communication using Transmission Control Protocol ("TCP") does not support multicasting and thus in spite of being reliable is not effectively used for discovery process in a network in combination with multicasting. Also, the Distributed Component Object Model ("DCOM") and common object request broker architecture ("CORBA") provides a means for application over a network to communicate. However, special protocols are required in each of the architectures and such communication may become difficult to initialize and maintain.

There is therefore a need for a simple yet a reliable method for dynamic discovery of peers applications existent in the network and information about these peer applications, which may be implemented with various operating systems and networks.

SUMMARY OF THE INVENTION

The present invention provides a method for reliable dynamic discovery and maintenance of information regarding peer applications running on a network. In one embodiment of the present invention, the operation of an application may require particular network elements or peers to be active and software applications running on these peers to be active. In order to discover and maintain information on active peer applications in a network, a list is maintained and consistently updated on each of these active peers in the network.

In one embodiment of the invention, a plurality of peer applications subscribe to a multicast address in order to receive multicast packet describing peer application status. If a peer application transmits a multicast packet, the other active peer applications in the network receive the packet on the particular address and each updates its list describing the other peer devices and applications thereon.

The multicast packet sent by peer application may also include the server socket number of the associated peer application sending the multicast packet. The multicast messaging by every active peer application is repeated in regular interval that is predefined, but may be varied by certain factors such as network congestion.

If a recipient peer application does not receive a multicast packet from a particular source peer, described on its list, then the source peer is suspected of being unavailable for communication. In response, the recipient peer application transmits a TCP request to the source peer application suspected of being unavailable. If the source peer application suspected of being unavailable sends a message confirming its existence, then the recipient peer application marks the source peer application as active in its list and updates its time stamp.

If the recipient peer application receives a failure in response to its TCP request, then the recipient peer application is confirmed that the peer is not part of the dynamic group presently using the application. In one embodiment, the source peer application to which the TCP connection fails is removed from the list. The list with every peer is similarly updated to reflect latest changes in the peer applications running in the network.

The method as described in the invention can be implemented with various operating systems and various types of network supporting TCP and multicasting. This feature of the present invention makes the invention compatible to wide variety of network and operating systems.

Furthermore, an embodiment of the present invention may comprise of a computer program product embodied on a computer readable medium for updating and maintaining peer application information on a network. The computer program product comprises computer instructions for performing necessary operations to maintaining the peer applications information on the network. The computer may be instructed to maintain a list of active peer applications on each peer application of the plurality of peer applications, wherein the plurality of peer applications operating on a plurality of peer devices and the plurality of peer devices are connected to the network. The computer may also be instructed to intermittently broadcasting a multicast packet containing information describing a source peer application on said network, wherein each peer application of the plurality of peer applications intermittently operating as said source peer application relative to a receiving, group of peer applications, and wherein the receiving group of peer applications comprises the plurality of peer applications within the network excluding the source peer application, The computer may also be instructed to intermittently receiving said multicast packet by at least one recipient peer application of the receiving group of peer applications, The computer may also be instructed to intermittently update the list of active peer applications on the at least one recipient peer application based on the multicast packet broadcast by the source peer application. The computer may also be instructed to determining by the at least one recipient peer application that the source peer application is suspected of being inactive if the at least one recipient peer application does not receive the intermittently broadcast multicast packet from the source peer application within a particular period of time. The computer may also be instructed to transmit a request from the at least one recipient peer application to the source peer application if the source peer application is determined to be suspected of being inactive. The computer may also be instructed to receive the request from the at least one recipient peer application at the source peer application if the source peer application is operational on the network. The computer may also be instructed to transmit a response to the request by the source peer application to the at least one recipient peer application if the source peer application is operational on the network. The computer may also be instructed to receive the response to the request from the source peer application by the at least one recipient peer application if the source peer application is operational on the network. The computer may also be instructed to update the list of active peer applications on the at least one recipient peer application based on the response to the request of the source peer application such that a lack of the response to the request from the source peer application indicates that the source peer application is inactive.

Other objects, features and advantages of the invention will be apparent from the drawings, and from the detailed description that follows below.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

A system, apparatus and method for reliable dynamic discovery of peer applications operating on a network are described. In one embodiment of the invention, a list of peer applications running on a network is maintained on each peer device that is required by the operation of the peer application(s). A failover function is provided to keep a reliable updated list of the active peer applications.

The method as described in the invention can be implemented with various operating systems and various types of network supporting TCP and multicasting. This feature of the present invention makes the invention compatible to wide variety of networks and operating systems.

The invention described herein is explained using specific exemplary details for better understanding. However, the invention disclosed can be worked on by a person skilled in the art without the use of these specific details. The implementations of the invention can be embodied into a multiple types of networks. The block diagrams shown are only exemplary implementation as per the rules dictated by the invention. Also, the connections between various network elements may not necessarily be direct and the data transfer in between can be subjected to encoding, reformatting or modifications.

References in the specification to "one embodiment" or "an embodiment" means that a particular feature, structure, characteristic, or function described in connection with the embodiment is included in at lest one embodiment of the invention. The appearances of the phrase "in one embodiment" in various places in the specification are not necessarily all referring to the same embodiment.

A. Overview

Figure 3:
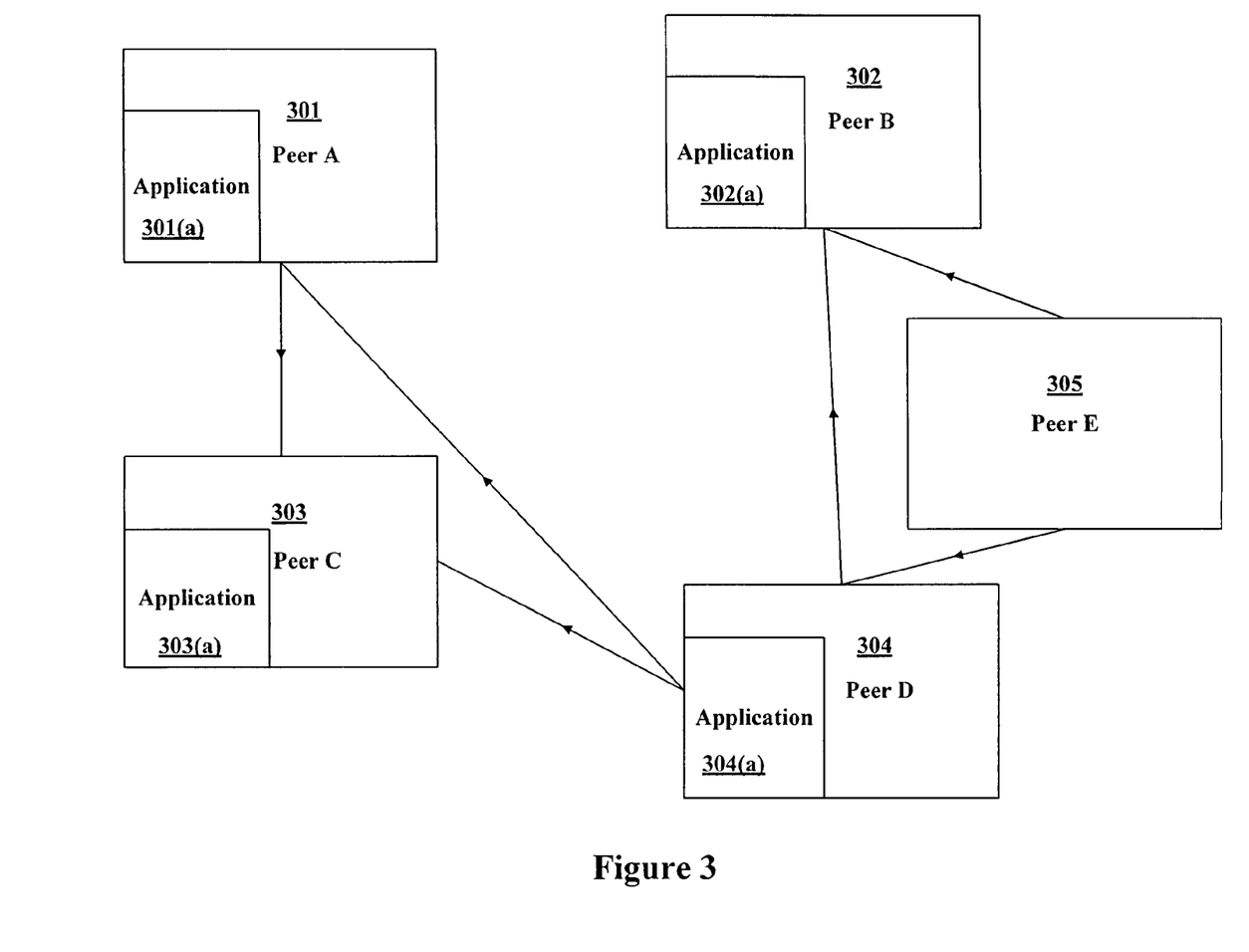
FIG. 3 shows an exemplary network architecture over which dynamic discovery of peer applications may occur according to one embodiment of the invention.

FIG. 3 represents an exemplary network over which reliable dynamic discovery of peer applications takes place. A network of Peer A 301, Peer B 302, Peer C 303, Peer D 304 and Peer E 305 is shown which can be further expanded to include any number of peer elements. The network of peers is generally provided to enable inter communication between the peers. To enable a peer to interact with any other peer over a reliable channel the peer needs to have the location or the destination address of the peer for which the data is intended.

A network, supporting multicast enables the peers to send information to multiple recipients and does not need the specific destination address of every peer. Rather, a multicast address can be used to send the packet of information to multiple peers without having the need to send an individual packet to every peer. To enable communications between the peers using multicasting, all the peer applications running on various peers in the network subscribe to a multicast address to receive the multicast message.

The operation of a particular application on the network may require certain peer devices to be active. Specifically, in a given instance there may be multiple peers, which are running the application, while other peers are not. For instance, as illustrated in FIG. 3, Peer A 301, Peer B 302, peer C 303 and peer D 304 are running the application. While peer E 305 is not running the application.

In one embodiment of the invention, the applications 301(a), 302(a), 303(a), 304(a) operating on the Peers consistently multicast their positions and other characteristics on a particular multicast address. Each of the Peers is able to receive and recognize the multicast packet by listening on a particular multicast address or port. As a result, network peer applications are able to maintain current information about certain relevant peers on the network.

B. Reliable Dynamic Discovery

Figure 4:
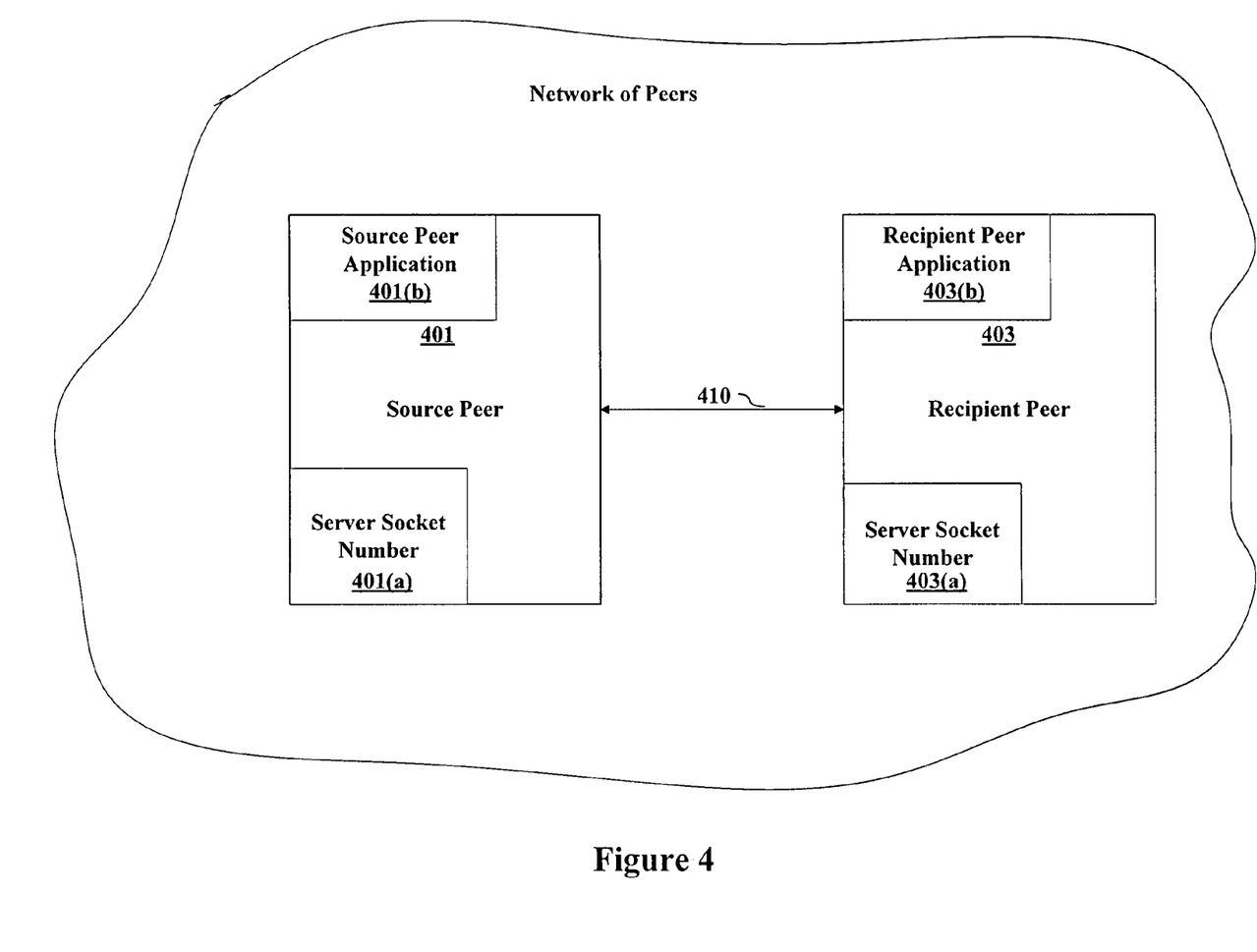
FIG. 4 shows a source peer application and recipient peer application undergoing a communication under failover part according to one embodiment of the invention.

An apparatus and method for dynamic discovery of peer devices, and applications operating thereon, is described in relation to FIG. 4. As shown in this figure, a source peer device 401 has both a source peer application 401(b) and a server socket number 401(a) associated with the application 401(b). In addition, a recipient peer 403 has a recipient peer application 403(b) and a server socket number 403(a) associated with the application 401(b). The source peer 401 and recipient peer 403 communicate via a network connection 410. In one embodiment of the invention, the source peer 401 transmits a multicast packet on the server socket number 401(a) to the network. Certain peer devices, such as the recipient peer 403, are listening on that particular socket 403(a) for the multicast packet in order to maintain a current list of information about peers relevant to the peer applications 401(a), 403(a). This list may contain information such as a particular peer device network address and port information.

In this particular example, the multicast packet information from the source peer 401 is used to maintain a current record of active peer applications and associated server socket numbers in the form of a list. Accordingly, the recipient peer 403 would update its list with the information received from the source peer 401. This information would allow the source peer 401 and recipient peer 403 to communicate.

In one embodiment, after receiving a multicast packet describing a peer application that is operating on the network, each peer application that received the packet would compare the received information to its internal peer list. If there are no changes in the information in the list, the list is updated with a new time stamp. If a new peer application has become operable on the network, then the received information is added to the peer list. The multicast messaging is repeated by each relevant peer application that is active in the network.

Various design characteristics of peer discovery may be provided including modifying the time interval in which multicast packets are transmitted and corresponding lists are updated. One skilled in the art will recognize that the time interval over which every peer application sends multicasting message informing about its existence, relates to the reliability of the peer list maintained at each peer application. In one embodiment, the time at which the multicasting is repeated may be increased or decreased depending on network congestion at a particular time. For example, a multicast packet may be dynamically transmitted when a load or congestion across a network or section thereof falls below a particular threshold.

a) Fail Over Analysis

In one embodiment of the application, a failure of one or more of the peer applications on the network may be identified. This identification may be performed by monitoring multicast packets sent on the network and received on a particular socket or port number. For example, each peer application checks periodically the status of other peer applications existent in the network. If the recipient peer application 403(b) does not receive a multicast packet from the source peer application 401(b) within a prescribed period of time or when network congestion falls below a threshold, the recipient peer application 403(b) may respond accordingly.

In one embodiment, the recipient peer application 403(b) may attempt to communicate with the source peer application 401(b) using the server socket number 401(a) of the respective source peer application 401(b). This communication may be performed using a TCP connection associated with the appropriate socket numbers. For example, the recipient peer application 403(b) may send a message, inquiring about the existence of source peer application 401(b) using TCP request on the server socket number 401(a) associated with the source peer application 401(b). If the source peer application 401(b) is unable to respond or has been removed from the network then the TCP port of source peer 401 fails and the recipient peer application 403(b) is notified. In particular, the failure of message sent on sever socket number 401(a) associated with source peer application 401(b) confirms recipient peer application 403(b) that the source peer application 401(b) is not existent.

If the source peer application 401(b) sends a packet replying of its existence, the recipient peer application 403(b) time updates the information in the list. This confirms the recipient peer application 403(b) of the status of the source peer application 401(b). The list status is thus updated at recipient peer application 403(b).

C. Method for Peer Application Discovery

Figure 5:
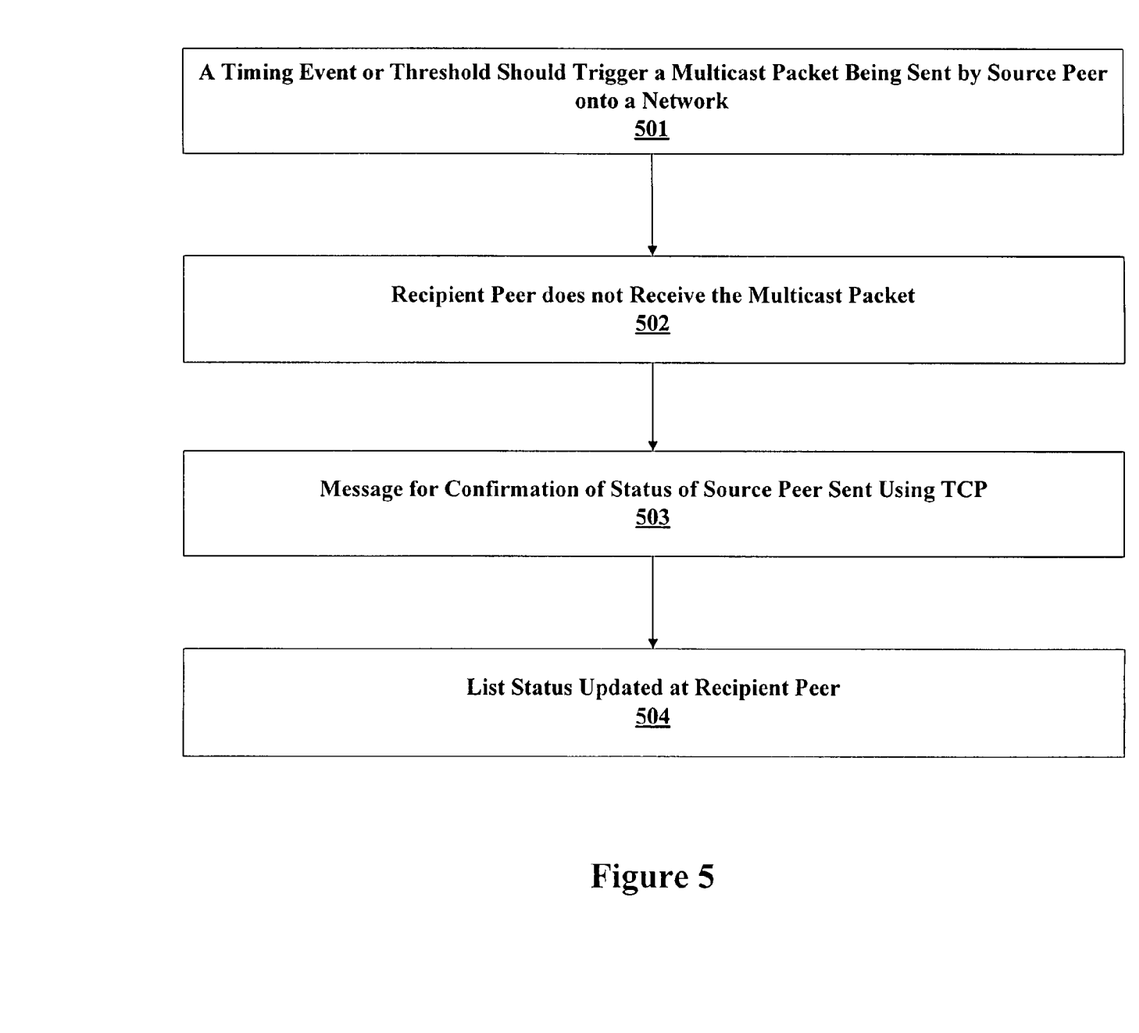
FIG. 5 shows a flowchart illustrating a method of peer discovery on a network according to one embodiment of the invention.

FIG. 5 illustrate a method, independent of structure, for updating and maintaining peer application information according to one embodiment of the invention. Information regarding these peer devices and applications thereon are maintained by intermittently transmitting multicast packets on the network. The triggering event for sending the packets may be provided using various techniques including predetermined time intervals, relative to network congestion, etc.

In this particular example, a triggering event is provided after which a source peer device should transmit a multicast packet 501 on a particular socket or port address associated with an application(s) operating on the network. A recipient peer does not receive 502 the multicast packet on the particular socket or port address for a period after the triggering event.

In response, the recipient peer sends 503 a message using TCP to the source peer for confirmation of its status. If the recipient peer does not receive confirmation from the source peer, then the source peer is marked as a failure within the network. If the recipient peer does receive confirmation, then the source peer is marked as operable and updated 504 with the information within the confirmation.

While the present invention has been described with reference to certain exemplary embodiments, those skilled in the art will recognize that various modifications may be provided. Accordingly, the scope of the invention is to be limited only by the following claims.

What is claimed is:

1. A method for discovering and maintaining information on a plurality of peer applications within a network, said method comprising:
    maintaining a list of active peer applications on each peer application of said plurality of peer applications, said plurality of peer applications operating on a plurality of peer devices, said plurality of peer devices connected to said network;
    intermittently broadcasting a multicast packet containing information describing a source peer application on said network, each peer application of said plurality of peer applications intermittently operating as said source peer application relative to a receiving group of peer applications, said receiving group of peer applications comprising said plurality of peer applications within said network excluding said source peer application;
    intermittently receiving said multicast packet by at least one recipient peer application of said receiving group of peer applications;
    intermittently updating said list of active peer applications on said at least one recipient peer application based on said multicast packet broadcast by said source peer application;
    determining by said at least one recipient peer application that said source peer application is suspected of being inactive if said at least one recipient peer application does not receive said intermittently broadcast multicast packet from said source peer application within a particular period of time;
    transmitting a request from said at least one recipient peer application to said source peer application if said source peer application is determined to be suspected of being inactive;
    receiving said request from said at least one recipient peer application at said source peer application if said source peer application is operational on said network;
    transmitting a response to said request by said source peer application to said at least one recipient peer application if said source peer application is operational on said network;
    receiving said response to said request from said source peer application by said at least one recipient peer application if said source peer application is operational on said network; and
    updating said list of active peer applications on said at least one recipient peer application based on said response to said request of said source peer application such that a lack of said response to said request from said source peer application indicates that said source peer application is inactive.

2. The method of claim 1 wherein said multicast packet is broadcast according to a predefined time interval.

3. The method of claim 1 wherein said multicast packet is broadcast depending on an amount of congestion in the network.

4. The method of claim 1 wherein said multicast packet contains a network address of said source peer application.

5. The method of claim 4 wherein said network address is a server socket address.

6. The method of claim 1 wherein said at least one recipient peer application identifies said source peer application as failed if said request returns a failure.

7. The method of claim 1 wherein said at least one recipient peer application identifies said source peer application as active if said response to said request is received from said source peer application in response to said request.

8. The method of claim 7 wherein said list of active peer applications is updated with a timestamp corresponding to said response sent from said source peer application.

9. The method of claim 1 wherein said request is transmitted according to Transmission Control Protocol.

10. A network that discovers and maintains information on applications within said network comprising:
    a plurality of peer devices connected to said network;
    a plurality of peer applications operating on said plurality of peer devices connected to said network, each of said plurality of peer applications maintaining a list of active peer applications;
    a source peer device, coupled within said network, said source peer device being one of said plurality of peer devices connected to said network;
    a source peer application having an associated source multicast address on which a multicast packet containing information describing said source peer application is intermittently broadcast on said network, said source peer application operating on said source peer device, said source peer application being one of said plurality of peer applications, said source peer application receiving a source active request from at least one of said plurality of peer applications if said source peer application is operational on said network, said source peer application transmitting a source active response to said source active request to said at least one said plurality of peer applications that sent said source active response if said source peer application is operational on said network;
    at least one recipient peer device, coupled within said network, said at least one recipient peer device being at least one of said plurality of peer devices connected to said network; and
    at least one recipient peer application having an associated recipient socket number on which said intermittently broadcast multicast packet containing information describing said source peer application is received, said at least one recipient peer application operating on said at least one recipient peer device, said at least one recipient peer application being at least one of said plurality of peer applications, said at least one recipient peer application intermittently updating said list of active peer applications on said at least one recipient peer application based on said multicast packet broadcast by said source peer application, said at least one recipient peer application determining that said source peer application is suspected of being inactive if said at least one recipient peer application does not receive said intermittently broadcast multicast packet from said source peer application within a particular period of time, said at least one recipient peer application transmitting said source active request to said source peer application if said source peer application is determined to be suspected of being inactive, said at least one recipient peer application receiving said source active response from said source peer application if said source peer application is operational on said network, said at least one recipient peer application updating said list of active peer applications on said at least one recipient peer application based on said source active response such that a lack of said source active response from said source peer application indicates that said source peer application is inactive.

11. The network of claim 10 wherein said source active request is performed according to Transmission Control Protocol.

12. The network of claim 10 wherein said multicast packet is intermittently broadcasted on said network in equal time intervals.

13. The network of claim 10 wherein said multicast packet is intermittently broadcasted on said network according to network congestion.

14. The network of claim 10 wherein said source active request is transmitted by said at least one recipient peer application to said source peer application at a predefined time interval following transmission of said intermittently broadcast multicast packet and during which additional intermittently broadcast multicast packets are not received by said at least one recipient peer application.

15. A computer program product embodied on a computer readable medium for updating and maintaining peer application information on a network, said computer program product comprising computer instructions for:
   maintaining a list of active peer applications on each peer application of said plurality of peer applications, said plurality of peer applications operating on a plurality of peer devices, said plurality of peer devices connected to said network;
   intermittently broadcasting a multicast packet containing information describing a source peer application on said network, each peer application of said plurality of peer applications intermittently operating as said source peer application relative to a receiving, group of peer applications, said receiving group of peer applications comprising said plurality of peer applications within said network excluding said source peer application;
   intermittently receiving said multicast packet by at least one recipient peer application of said receiving group of peer applications;
   intermittently updating said list of active peer applications on said at least one recipient peer application based on said multicast packet broadcast by said source peer application;
   determining by said at least one recipient peer application that said source peer application is suspected of being inactive if said at least one recipient peer application does not receive said intermittently broadcast multicast packet from said source peer application within a particular period of time;
   transmitting a request from said at least one recipient peer application to said source peer application if said source peer application is determined to be suspected of being inactive;
   receiving said request from said at least one recipient peer application at said source peer application if said source peer application is operational on said network;
   transmitting a response to said request by said source peer application to said at least one recipient peer application if said source peer application is operational on said network;
   receiving said response to said request from said source peer application by said at least one recipient peer application if said source peer application is operational on said network; and
   updating said list of active peer applications on said at least one recipient peer application based on said response to said request of said source peer application such that a lack of said response to said request from said source peer application indicates that said source peer application is inactive.

16. The computer program product of claim 15 wherein said request is transmitted according to Transmission Control Protocol.

17. The computer program product of claim 15 wherein said multicast packet is broadcast depending on an amount of congestion in said network.

18. The computer program product of claim 15 wherein said request from said at least one recipient peer application is transmitted after at least one additional multicast packet has not been received by said at least one recipient peer application during a predefined time period after said multicast packet is received is received by said at least one recipient peer application.

19. The computer program product of claim 15 wherein said at least one recipient peer application identifies source peer application as failed if said request returns a failure.

* * * * *